(12) United States Patent
Akcin

(10) Patent No.: US 9,819,760 B2
(45) Date of Patent: Nov. 14, 2017

(54) METHOD AND SYSTEM FOR ACCELERATED ON-PREMISE CONTENT DELIVERY

(71) Applicant: Microsoft Technology Licensing, LLC, Redmond, WA (US)

(72) Inventor: Mehmet Akcin, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 14/613,198

(22) Filed: Feb. 3, 2015

(65) Prior Publication Data
US 2016/0226992 A1 Aug. 4, 2016

(51) Int. Cl.
 *G06F 15/173* (2006.01)
 *H04L 29/08* (2006.01)
 (Continued)

(52) U.S. Cl.
 CPC ...... *H04L 67/2842* (2013.01); *H04L 65/1069* (2013.01); *H04L 65/4084* (2013.01);
 (Continued)

(58) Field of Classification Search
 USPC ........ 709/213, 203, 220, 224, 214; 370/252, 370/254
 See application file for complete search history.

(56) References Cited

U.S. PATENT DOCUMENTS

| 7,653,689 B1 * | 1/2010 | Champagne ....... | H04N 21/2402 709/203 |
| 8,014,308 B2 * | 9/2011 | Gates, III ........... | H04L 12/66 370/252 |

(Continued)

FOREIGN PATENT DOCUMENTS

| CN | 103176846 A | 6/2013 |
| WO | 2013071949 A1 | 5/2013 |

OTHER PUBLICATIONS

"International Search Report and Written Opinion Issued in PCT Application No. PCT/US2016/016031", dated Aug. 16, 2016, 18 Pages.

(Continued)

*Primary Examiner* — Tammy Nguyen
(74) *Attorney, Agent, or Firm* — The Watson IP Group, PLC; Vladan M. Vasiljevic

(57) ABSTRACT

In various embodiments, methods and systems for accelerating on-premise delivery of content items using a unified content delivery network system are provided. A request is received from a content device for a content item. The request is communicated using a content delivery network protocol where the content delivery network protocol supports a unified content delivery network profile between content devices, local off-net cache devices, and content delivery network platform servers. A determination that the content item is not cached at a local off-net cache device is made, where the local off-net cache device is identified in the unified content delivery network profile as corresponding to one or more content devices. A retrieval routine for downloading the content item to the content device is selected; the retrieval routine is selected using the unified content delivery network profile. The content item is retrieved to the content device using the selected retrieval routine.

20 Claims, 7 Drawing Sheets

(51) Int. Cl.
*H04L 29/06* (2006.01)
*H04N 21/20* (2011.01)
*H04N 21/231* (2011.01)
*H04N 21/222* (2011.01)
*H04N 21/239* (2011.01)

(52) U.S. Cl.
CPC .............. *H04L 65/80* (2013.01); *H04L 67/10* (2013.01); *H04L 67/1061* (2013.01); *H04L 67/2847* (2013.01); *H04L 67/30* (2013.01); *H04N 21/20* (2013.01); *H04N 21/222* (2013.01); *H04N 21/231* (2013.01); *H04N 21/2393* (2013.01); *H04N 21/23106* (2013.01)

(56) References Cited

U.S. PATENT DOCUMENTS

| | | | | |
|---|---|---|---|---|
| 8,346,935 | B2* | 1/2013 | Mayo | G06F 9/5077 709/214 |
| 8,725,861 | B2* | 5/2014 | Weller | G06Q 40/04 370/254 |
| 8,799,674 | B1* | 8/2014 | Leighton | G06F 21/602 713/171 |
| 8,838,725 | B2 | 9/2014 | Delos Reyes et al. | |
| 8,863,204 | B2* | 10/2014 | Whyte | H04N 21/222 709/219 |
| 9,405,685 | B2* | 8/2016 | Lee | G06F 12/0802 |
| 2008/0205291 | A1 | 8/2008 | Li et al. | |
| 2010/0325303 | A1 | 12/2010 | Wang et al. | |
| 2011/0055386 | A1* | 3/2011 | Middleton | H04L 67/125 709/224 |
| 2011/0060812 | A1* | 3/2011 | Middleton | G06F 17/30902 709/219 |
| 2012/0198075 | A1* | 8/2012 | Crowe | H04L 67/2847 709/226 |
| 2013/0018978 | A1* | 1/2013 | Crowe | H04L 67/2842 709/214 |
| 2014/0025811 | A1 | 1/2014 | Gagliardi et al. | |
| 2014/0040412 | A1 | 2/2014 | Yanagihara et al. | |
| 2014/0095676 | A1* | 4/2014 | Beno | G06F 8/60 709/220 |
| 2014/0115282 | A1* | 4/2014 | Natkovich | G06F 12/16 711/162 |
| 2014/0157249 | A1 | 6/2014 | Perez Diez et al. | |
| 2014/0195675 | A1* | 7/2014 | Silver | H04L 65/1083 709/224 |
| 2014/0280679 | A1 | 9/2014 | Dey et al. | |
| 2014/0307734 | A1* | 10/2014 | Luby | H04L 12/18 370/390 |
| 2016/0124999 | A1* | 5/2016 | Gonzalez Brenes | G06F 17/30297 707/803 |
| 2016/0127244 | A1* | 5/2016 | Gonzalez Brenes | H04L 47/41 709/217 |
| 2016/0127248 | A1* | 5/2016 | Gonzalez Brenes | H04L 47/365 370/477 |
| 2016/0226992 | A1* | 8/2016 | Akcin | H04L 67/2842 |

OTHER PUBLICATIONS

Han, et al., "Hulu in the Neighborhood", In Proceedings of Third International Conference on Communication Systems and Networks, Jan. 4, 2011, 10 Pages.

Zhang, Zhi-Li., "Feel Free to Cache: Towards an Open CDN Architecture for Cloud-Based Content Distribution", In Proceedings of International Conference on Collaboration Technologies and Systems, May 19, 2014, 3 pages.

Srinivasan, et al., "ActiveCDN: Cloud Computing Meets Content Delivery Networks", In Columbia University Computer Science Technical Reports, CUCS-045-11, Nov. 2011, 7 Pages.

Wang, et al., "The Content Delivery Network System based on Cloud Storage", In Proceedings of International Conference on Network Computing and Information Security, vol. 1, May 14, 2011, pp. 98-102.

"Content Distribution Network", Retrieved from <<http://www.akamai.com/html/resources/content-distribution-network.html>>, Retrieved on: Dec. 16, 2014, 2 Pages.

"StrandVision Introduces On-premise Distribution Server", Retrieved from <<http://www.strandvision.com/news_0503_on_premise_distribution_server.html, Retrieved on: Dec. 16, 2014, 1 Page.

Woo, et al, "A Virtualized, Programmable Content Delivery Network", In Proceedings of 2nd IEEE International Conference on Mobile Cloud Computing, Services, and Engineering, Apr. 8, 2014, pp. 159-168.

\* cited by examiner

METHOD AND SYSTEM FOR ACCELERATED ON-PREMISE CONTENT DELIVERY

BACKGROUND

Internet-connected devices can be configured to access content offered by a content provider using off-net content delivery network (CDN) services. Content can be communicated using an internet service provider with access to off-net CDNs. Off-net CDNs can accelerate functionality supported by the devices because the content received is from geographically distributed network servers that replicate and cache content. CDNs can reduce bandwidth costs, improve page load time, and increase global availability of content. CDNs can support web objects (text, graphics, and scripts), downloadable objects (media files, software, and documents), applications (e-commerce, portals), live streaming media, on-demand media, and social networks. The number of nodes and servers making up a CDN can vary depending on the architecture, some reaching thousands of nodes with tens of thousands of servers. The servers can be placed in remote point of presences (PoPs) located outside a content provider's regional networks. As such, cacheable content implicates several factors such as proximity, jurisdiction, optimization, power, space, and hardware requirements to make data available via the off-net CDNs. These factors can be burdensome on a content provider that has to frequently consider efficient delivery of content, quality of service, and bandwidth, and purchasing, shipping, and maintenance of hardware that support an off-net CDN infrastructure.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein provide methods and systems for accelerating on-premise delivery of content items based on a unified content delivery network system. A request is received from a content device, for a content item. The request is communicated using a content delivery network protocol where the content delivery network protocol supports a unified content delivery network profile between content devices, local off-net cache devices, and content delivery network platform servers. The unified content delivery network profile comprises an indication of content items, content providers, and corresponding discovered content devices that share a local area network having the local off-net cache. Content items, content providers, and content devices are also tracked therein for logically retrieving requested content items and prefetching anticipated content items using a local off-net cache device. The unified content delivery network profile is configurable with configuration settings for managing attributes of the unified content delivery profile. A determination whether a content item is available at the local off-net cache device is made, such that, when the content item is cached at the local off-net cache device the content item is retrieved from the local off-net cache device. However, when the content item is not cached at a local off-net cache device, a retrieval routine is determined. The retrieval routine for downloading the content item to the content device is selected; the retrieval routine is selected based on the unified content delivery network profile. The content item is retrieved from a content delivery network platform server to the content device using the selected retrieval routine. It is contemplated that the content delivery network platform comprises integrated components that facilitate communicating content items based on the content delivery network protocol that supports the unified content delivery network profile.

BRIEF DESCRIPTION OF THE DRAWINGS

The present invention is described in detail below with reference to the attached drawing figures, wherein.

DETAILED DESCRIPTION

Figure 1:
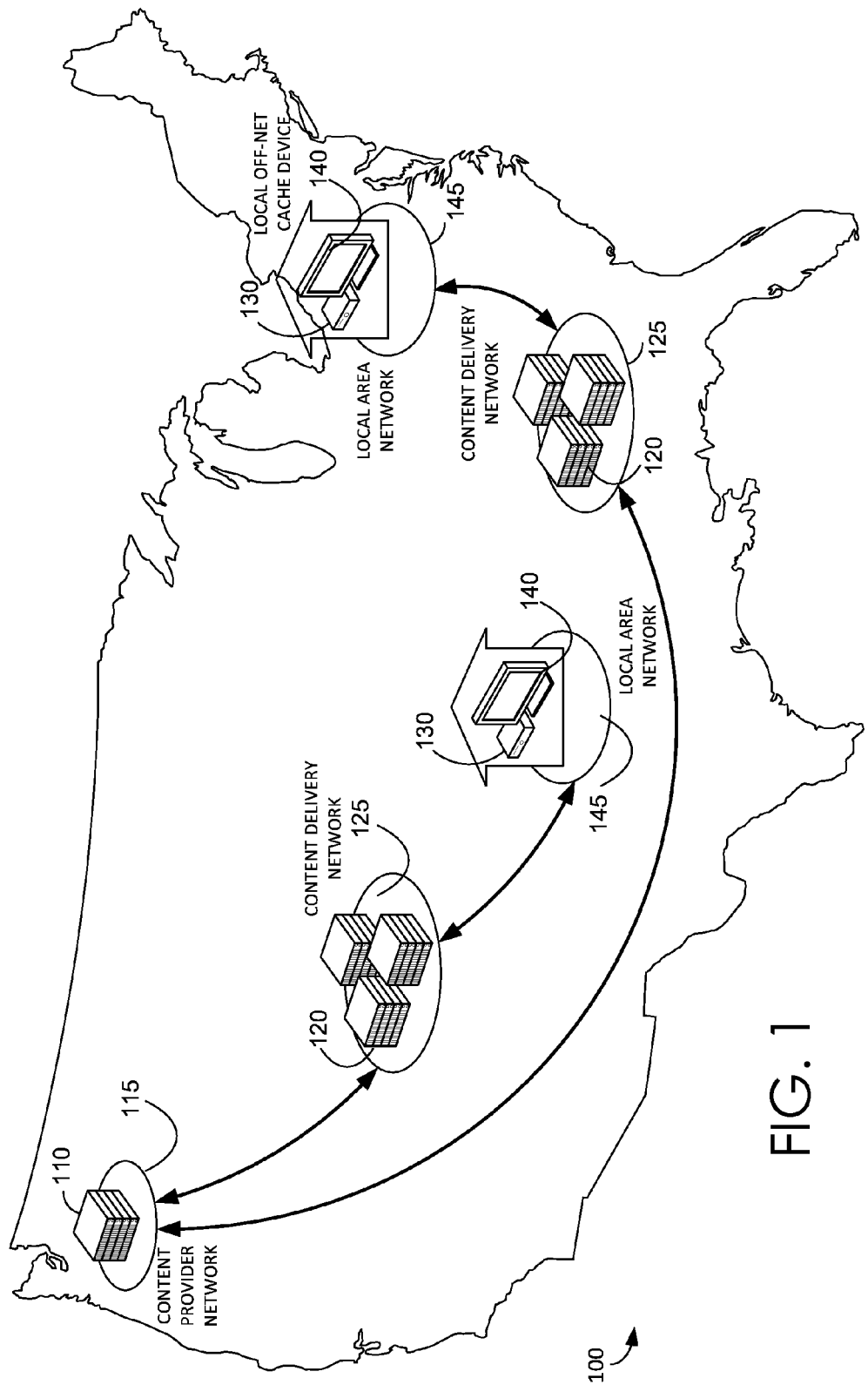
FIG. 1 is a block diagram of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to distributed computing devices utilizing a unified content delivery network application or service supported by an end-to-end content delivery network platform. However, the methods described herein can be performed in different types of operating environments having alternate configurations of the functional components described herein. As such, the embodiments described herein are merely exemplary, and it is contemplated that the techniques may be extended to other implementation contexts.

Internet-connected devices can be configured to access content of a content provider using off-net content delivery network (CDN) services. Content can be communicated using an internet service provider with access to off-net CDNs. Off-net CDNs can accelerate functionality supported by the devices because the content received is from geographically distributed network servers that replicate and cache content. CDNs can reduce bandwidth costs, improve page load time, and increase global availability of content. CDNs can support web objects (text, graphics, and scripts), downloadable objects (media files, software, and documents), applications (e-commerce, portals), live streaming media, on-demand media, and social networks. The number of nodes and servers making up a CDN can vary depending on the architecture, some reaching thousands of nodes with tens of thousands of servers. The servers can be placed in remote point of presences (PoPs) located outside a content provider's regional networks. As such, cacheable content implicates several factors such as proximity, jurisdiction, optimization, power, space, and hardware requirements to make data available via the off-net CDNs.

By way of example, a CDN may load media traffic on regional network infrastructures but cannot prevent bottlenecks close to consumers. However, content providers also do not own end-to-end delivery infrastructures, so it can be difficult to control. Cost per Mbits/second can be substantial when hosting an off-net when a significant footprint of data is involved. Moreover, content provider that has to frequently consider efficient delivery of content, quality of service, and bandwidth, and purchasing, shipping, and maintenance of hardware that support an off-net CDN infrastructure. In this regard, conventional content delivery using off-net caching can be limited and inefficient in implementation.

Embodiments of the present invention provide simple an efficient methods and systems for accelerating on-premise delivery of content items based on a unified content delivery network infrastructure and protocol that supports an end-to-end software-based content delivery network platform on content devices, local off-net cache devices, and content delivery network platform servers. A unified content delivery network system provides intelligent retrieval of content items using a content delivery network protocol that implements a unified content delivery network profile for content delivery network content devices ("content device"), local off-net cache devices ("local cache device"), and content delivery network platform servers ("platform server").

At a high level, the content delivery network protocol ("protocol") identifies rules, policies, and logic for delivery of content items to content devices in the content delivery network. The protocol can refer to an agreed upon set of behaviors, based on content delivery network platform, of different components in a content delivery network infrastructure for accelerating on-premise delivery of content items. The protocol implemented using a software-based end-to-end content delivery network platform implemented as an application or service on content devices, local off-net cache devices, and content delivery network devices. The protocol can be implemented with a unified content delivery network profile associated with the corresponding content devices, local off-net cache devices, and platform servers.

The unified content delivery network profile can specifically include an indication of content items, content providers, corresponding to discovered local devices which are tracked and updated and made accessible for retrieval of content items. Content items may generally refer to information delivered to an end-user in specific contexts (e.g., listening to music, watching movies, playing video games, browsing websites). Content items may include, but is not limited to, audio files, video files, image files, and video games. Content items may also include computer programming code, JavaScript, HTML, etc. for example, software. Content items can be associated with content providers that are responsible for distributing the content items. By way of example, a content item can be video content, with NETFLIX of Los Gatos, Calif. as the associated content provider. A content provider can use a content delivery network comprising a large distributed system of servers deployed in data centers across the internet to serve end-users their content items. In this regard, the unified content delivery network profile supported by the protocol can be accessed when determining how to retrieve content items.

The protocol supports a dynamic connectivity mechanism to facilitate discovery and communication between content devices and the local off-net cache device. Dynamic connectivity can be implemented using a universal plug and play that supports zero-configuration network. The discovered local devices can be identified using zero-configuration networking with data and messages communicated using the protocol. In this regard, content devices or the local off-net cache device can discover other local content devices and generate and update a unified content delivery network profile for the local off-net cache device to facilitate delivering content items to the content devices.

Embodiments described herein support local off-net caching based on the content delivery network platform having the protocol supporting the unified content delivery network profile. Local off-net caching may be implemented for use in a local area network (e.g., on-premise operating environment) based on a local off-net cache device that stores and distributes content items locally. The local off-net cache device can communicate with the discovered local devices using the local area network. The use of local area network herein is not meant to be limiting but rather contemplates a network environment where a local off-net cache device is in communication with a local devices on the same network. A local area network can include a network in a home, school, computer laboratory, or office building, using network media.

The unified content delivery network system provides internet-connected devices with content items that are cached using the local off-net caching device. Devices can include Internet of Things (IoT) devices that are interconnected with existing internet infrastructure in order to provide automation in a variety of different fields. IoT devices can refer to a wide variety of devices (e.g., heart monitoring implants, biochip transponders, automobile sensors, field operation devices). Using a local off-net cache device can be beneficial to both the content providers and the consumer, in that, the content device and functionality thereof can operate more efficiently. Content providers can more resourcefully provide content items at a local level and make the content items readily available for a plurality of devices on a local area network instead of through the internet. Consumers also benefit from improved access to content items even when access to the internet is down. As such, there exists improved resiliency in access to content items as a user can still watch cached data on their devices, should a service interruption occur. Moreover, the content delivery network protocol and the unified content delivery network profile facilitate intelligently and logically requesting, retrieving and communicating content at different components of the content delivery network infrastructure.

In operation, by way of example, several devices can be associated with software (e.g., system update for APPLE OSX/IOS). A customer-premise equipment or customer-provided equipment (e.g., a local off-net caching device) can support a computing component (e.g., local off-net caching component) to support local off-net caching functionality. A content device can then access data on the local off-net caching device. The local off-net cache device can, in embodiments, implement dynamic connectivity mechanisms (e.g., Universal PnP, APPLE Bonjour, or Network Service Discovery) associated with the developer to facilitate communicating with the devices. The local off-net cache device can fetch the system update for the content devices and make the software available to each device on the local area network.

In another implementation, the devices can be associated with video content. The local off-net caching device can be implemented for caching video content. Users can enable caching on the local off-net caching device and define the available space for caching on the local off-net cache device, amongst other types of configurable features that can be captured in the unified content delivery network profile. A content device can request data from a supported content delivery network running a content delivery network platform server, such that, the video content is cached on the local off-net cache device. The local off-net cache device can communicate with the content device using the content delivery network protocol that supports dynamic connectivity and content sharing. In embodiments, a client application or service can be implemented on each of the content device, the local off-net cache device, and the content delivery network platform server in the unified content delivery network infrastructure.

The unified content delivery network infrastructure and protocol can specifically support content item prefetching to the local off-net cache device based on the unified content delivery network profile. Prefetching refers to retrieving content items in anticipation of the content being requested. Prefetch content can in particular include content items that a user would likely request next. Prefetching can be very helpful in reducing perceived wait times in retrieving content items. Embodiments herein overcome conventional complexities in prefetching content. For example, users are hard to predict, users may download content they never consume, and prefetching can be wasteful of resources utilized during prefetching. However, by implementing a unified content delivery network profile that is accessed before performing prefetching operations in the unified content delivery network, perfecting can be executed more efficiently. Moreover, the content is not prefetched to the content device but rather to a local off-net cache device that communicates the content to one or more additional content devices.

Content that can be prefetched from to the local off-net cache can be called to prefetch content items. Prefetch content items can be retrieved based on the unified content delivery network profiles ("profile"), specifically, the content device, content items accessed, and content providers tracked on the profile. For example, a content device has an out-of-date firmware version and a new firmware version is available, as such, the new firmware version can be prefetched to the local off-net cache. Further, based on content items (e.g., an episode of a television series) accessed at a content device, additional prefetch content items (e.g., an entire collection of episodes of the television series) can be downloaded. Other variations and combinations of identifying prefetch content items are contemplated with embodiments described herein.

It is contemplated that the profile can be configurable with configuration settings for managing attributes of the unified content delivery network profile. For example, a configurable attribute indicates how long to cache prefetch content. Also, content items are designated as prefetch content items for download, only when more than one content device is associated with the prefetch content (e.g., software update). Content providers can be excluded from prefetching, and priority levels can be set for particular content providers. Other variations and combinations of configurable settings for attributes are contemplated with embodiments described herein.

Prefetch content items can be prefetched using different prefetch routines (e.g., a peer-based prefetch routine, cache-based prefetch routine, or a network-based prefetch routine). A peer-based prefetching routine occurs when the prefetch content item is retrieved from a content device that downloaded the content item independently of the local area network and then the content is prefetched from the content device to the local off-net cache. A cache-based prefetching routine occurs when the local cache component intelligently determines based on the unified content delivery network profile that one or more content items can be retrieved as prefetch content item and then communicates a request to a content device or content delivery network platform server for the content item. A network-based prefetching routine occurs when content items are retrieved from a content delivery network platform server based on a content device retrieving the content items independently of the local area network and the content delivery network platform server intelligently communicates the prefetch content item to the local off-net cache. In this regard, the user upon returning to a local area network having the local off-net cache device can seamlessly access the prefetch content item from the local off-net cache device, with the content device or another content device.

In operation, a content device may download system update software independently of the local area network having the local off-net cache device. Upon entering the local area network, the local off-net cache device may communicate with the content device and using the content delivery network protocol, transfer the system update software to the local off-net cache device to make available to other content devices that require the same system update software. In another embodiment, the local off-net cache device can review the unified content delivery network profile and determine based on the profile, related content of a television series, for content devices, and communicate requests for the related content from the content devices or a content delivery network platform server. And in yet another embodiment, the content device can independently retrieve video game content and the content delivery network platform server communicates the video game content as prefetch content to the local off-net cache device associated with the content device. In this regard, the local off-net cache device includes prefetch video game content that can be used by the content device or one or more additional content devices associated with the local off-net cache device.

Embodiments of described herein can further improve the operation of content delivery network servers based on a content delivery network platform. Content delivery network platform servers refer to integrated components that facilitate the communication of cached content items. The integrated components refer to the hardware architecture and software framework that support content delivery functionality using the content delivery network platform. The hardware architecture refers to generic physical components and interrelationships thereof and the software framework refers to software providing functionality that can be implemented with hardware operated on a device. Specifically, the hardware architecture may be generic to simplify the functionality described herein using the software framework of the content delivery network platform. The end-to-end software-based content delivery network platform can operate with the content delivery network platform server to operate computer hardware to provide content delivery network functionality. As such, the content delivery network platform server can manage resources and provide services for the retrieval, caching, and distribution of content items. Any other variations and combinations thereof are contemplated with embodiments of the present invention.

By way of example, the content delivery network platform can include API library that includes specifications for routines, data structures, object classes, and variables may support the interaction the hardware architecture of the device and the software framework of the unified content delivery network system. These APIs include configuration specifications for the unified content delivery network system such that content device, local off-net cache devices, and content provider servers can communicate with in the unified content delivery network infrastructure. For example, a management interface may be integrated in the content delivery network platform to support communicating information via an interface at the server, the local off-net cache device, and the content device.

Accordingly, in a first embodiment described herein, a system for accelerating on-premise delivery of content items based on a unified content delivery network system is provided. The system includes a content component configured for communicating a request for a content item using a content delivery network protocol, wherein the content delivery network protocol supports a unified content delivery network profile between content devices, local off-net cache devices, and content delivery network platform servers; receiving the content item from a local off-net cache device when the content item is cached at the local off-net cache device, wherein the content item is received using the content delivery network protocol; and receiving the content item based on a retrieval routine when the content item is not cached at the local off-net cache, wherein the retrieval routine is selected based on the unified content delivery network profile.

The system further includes a local off-net cache component configured for: receiving the request from the content device for the content item, wherein the request is communicated using the content delivery network protocol; determining that the content item is not cached at the local off-net cache device, wherein the local off-net cache device is identified in the unified content delivery network profile as corresponding to one or more content devices; determining a retrieval routine for downloading the content item to the content delivery network content device, wherein the retrieval routine is selected based on the unified content delivery network profile; and retrieving the content item to the content device, wherein retrieving the content is based on the retrieval routine.

The system also includes a content delivery network platform component configured for: receiving the request for the content item using the content delivery network protocol, wherein the request is received at a content delivery network platform server having integrated components that facilitate accelerating on-premise delivery of content items based on the content delivery network protocol that supports the unified content delivery network profile; and communicating the content item using the retrieval routine, wherein the retrieval routine identified using the unified content delivery network profile.

In a second embodiment described herein, one or more computer storage media having computer-executable instructions embodied thereon that, when executed, by one or more processors, causes the one or more processors to perform a method for accelerating on-premise delivery of content items based on a unified content delivery network system, is provided. The method includes receiving a request from a content device for a content item. The request is communicated using a content delivery network protocol. The content delivery network protocol supports a unified content delivery network profile between content devices, local off-net cache devices, and content delivery network platform servers. The method includes determining that the content item is not cached at a local off-net cache device, where the local off-net cache device is identified in the unified content delivery network profile as corresponding to content devices. The method includes determining a retrieval routine for downloading the content item to the content device, where the retrieval routine is selected based on the unified content delivery network profile. The method further includes retrieving the content item to the content device, where retrieving the content is based on the retrieval routine.

In a third embodiment described herein, a computer-implemented method for accelerating on-premise delivery of content items based on a unified content delivery network system is provided. The method comprises receiving a request for a content item using the content delivery network protocol, where the request is received at a content delivery network platform server having integrated components that support accelerating on-premise delivery of content items based on the content delivery network protocol comprising the unified content delivery network profile. The method also includes communicating the content item using the retrieval routine. The retrieval routine is identified using the content delivery network protocol. The retrieval routine is selected from a group of retrieval routines comprising a direct retrieval routine, a simultaneous retrieval routine, and a two-phase retrieval routine.

Referring now to FIG. 1, FIG. 1 illustrates an exemplary unified content delivery network system ("content delivery system") 100 in which implementations of the present disclosure may be employed. In particular, FIG. 1 shows a high level architecture of content delivery system 100 having an infrastructure and communicating using protocols in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, content delivery system 100 includes a content provider server 110 in a content provider network 115, content delivery network platform server ("platform server") 120 in a content delivery network 125, local off-net cache device ("local cache device") 130, and a content delivery network content device ("content device") 140 in a local area network 145. A content provider can provide access to content items using content provider servers (e.g., content provider server 110) from the content provider network (e.g., content provider network 115). The content provider can rely on a content delivery network, as described herein, to communicate content items. It is contemplated that content providers can implement platform servers in the content provider network 115 to support functionality described herein.

Each of content device 140, local cache device 130, and platform server 120 may be any type of computing device, which may correspond to computing device 700 described with reference to FIG. 7, for example. The components of the content delivery 100 may communicate with each other over a network, which may include, without limitation, one or more local area networks (LANs) and/or wide area networks (WANs). Any number of nodes (e.g., servers) and client computing devices may be employed within the content delivery system 100 within the scope of implementations of the present disclosure.

In the content delivery system 100, the components support a unified content delivery network infrastructure and protocol. The content device 140 requests content items, based on a content delivery network protocol, to intelligently retrieve the content items from the local cache device 130 and platform server 120 using the content delivery network protocol. The platform servers 120 can be implemented on nodes that are utilized to store and provide access to content items. Each of the platform server 120, local cache device 130, and content device 140 may operate an application or service (e.g., unified content delivery network application or service) to facilitate providing the functionality described herein. The phrase "application" or "service" as used herein broadly refers to any software, or portions of software, that run on top of, or storage within, platform server 120, local cache device 130, and content device 140.

Having described various aspects of the content delivery system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Figure 2:
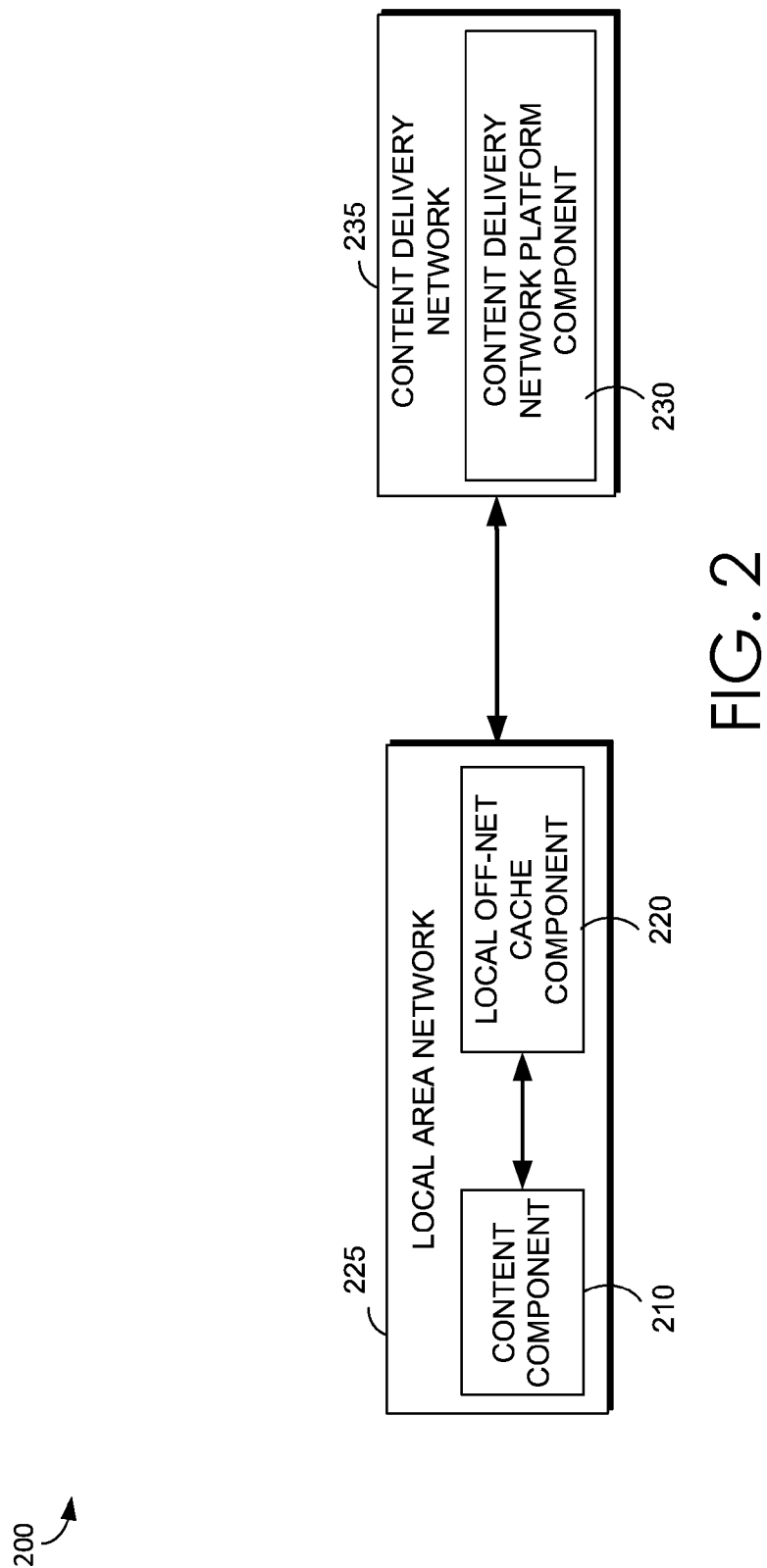
FIG. 2 is a schematic of an exemplary unified content delivery network system, in accordance with embodiments described herein.

With reference to FIG. 2, FIG. 2 includes the unified content delivery network infrastructure and protocol framework 200 ("framework") of the unified content delivery network system. The framework 200 and functionality supported therein can be described by way of an exemplary operating environment having several individual components. The framework 200 can include a content component 210 and local off-net cache component 220 in a local area network 225, and a content delivery platform 230 in a content delivery network 235. The components facilitate performing the functionality described herein and may be implemented on corresponding devices (e.g., content device, local off-net cache device, and content delivery network platform server).

With continued reference to FIG. 2, the content component 210 can be responsible for utilizing the content delivery network platform and protocol for performing operations for retrieving and communicating content items and unified content delivery network profile information in accordance with embodiments described herein. The content component 210 can generate and communicate a request for a content item using the content delivery network protocol. The content delivery network protocol supports a unified content delivery network profile between content devices, local off-net cache devices, and a content delivery network platform server. It is contemplated that a content delivery network platform server also can be implemented by a content provider supporting a content delivery network platform server from a content provider network.

The content component 210 can support generating the unified content delivery network profile ("profile"). Generating the profile can be based on discovering content device and a local off-net cache device that corresponds to the content devices. The content devices can each implement a content component that facilitates communication with other content devices, the local off-net cache device, and the unified content delivery network infrastructure. The unified content delivery profile includes an indication of content items, content providers, and discovered content devices that share a local area network having a local off-net cache device. The content items, content providers, and corresponding content devices are tracked in the unified content delivery network profile for logically retrieving requested content items and prefetching anticipated content items to the local off-net cache device. The unified content delivery network profile can include specific attributes related to the content devices and the local off-net cache device. Attributes can, by way of example, include, the type of device and corresponding metadata (e.g., version, operating system, firmware, capacity, content item log), content providers associated with the device, and rules, polices, and logic corresponding to the device. In this regard, attributes in the profile can be updated to reflect changes in the content device and local off-net cache device. The updated profile can be accessible to each of the content deices, local off-net cache devices, and content delivery network platform servers, using the content delivery network platform.

The content component 210 can automatically discover the local off-net cache device and content devices in the unified content delivery network profile. Automatically discovering the local off-net cache device can be based on the content delivery network protocol ("protocol") that implements a dynamic connectivity mechanism that supports zero-configuration networking. The protocol can further support data communication such that content items communicated using the content component 210 can be communicated using the protocol. The content delivery network protocol can be, by way of example, comprise a universal plug and play protocol with dynamic connectivity, and other variations and combinations thereof are contemplated with embodiments described herein.

The content component 210 can further be responsible for receiving an indication whether a content item of a corresponding request is available at the local off-net cache device. When the content item is available at the local off-net cache device, the content component 210 facilitates retrieving the content item from the local off-net cache device. Retrieving the content item from the local off-net cache device can be based on the protocol; however, other protocols are contemplated with embodiments described herein. When the content item is not available at the local off-net cache device a retrieval routine (e.g., a direct retrieval routine, a simultaneous retrieval routine, and a two-phase retrieval routine) can be identified at the local off-net cache device and communicated to the content component 210 for retrieving the content item. The retrieval routine is identified using the unified content delivery network profile, as described herein below in more detail.

Figure 3:
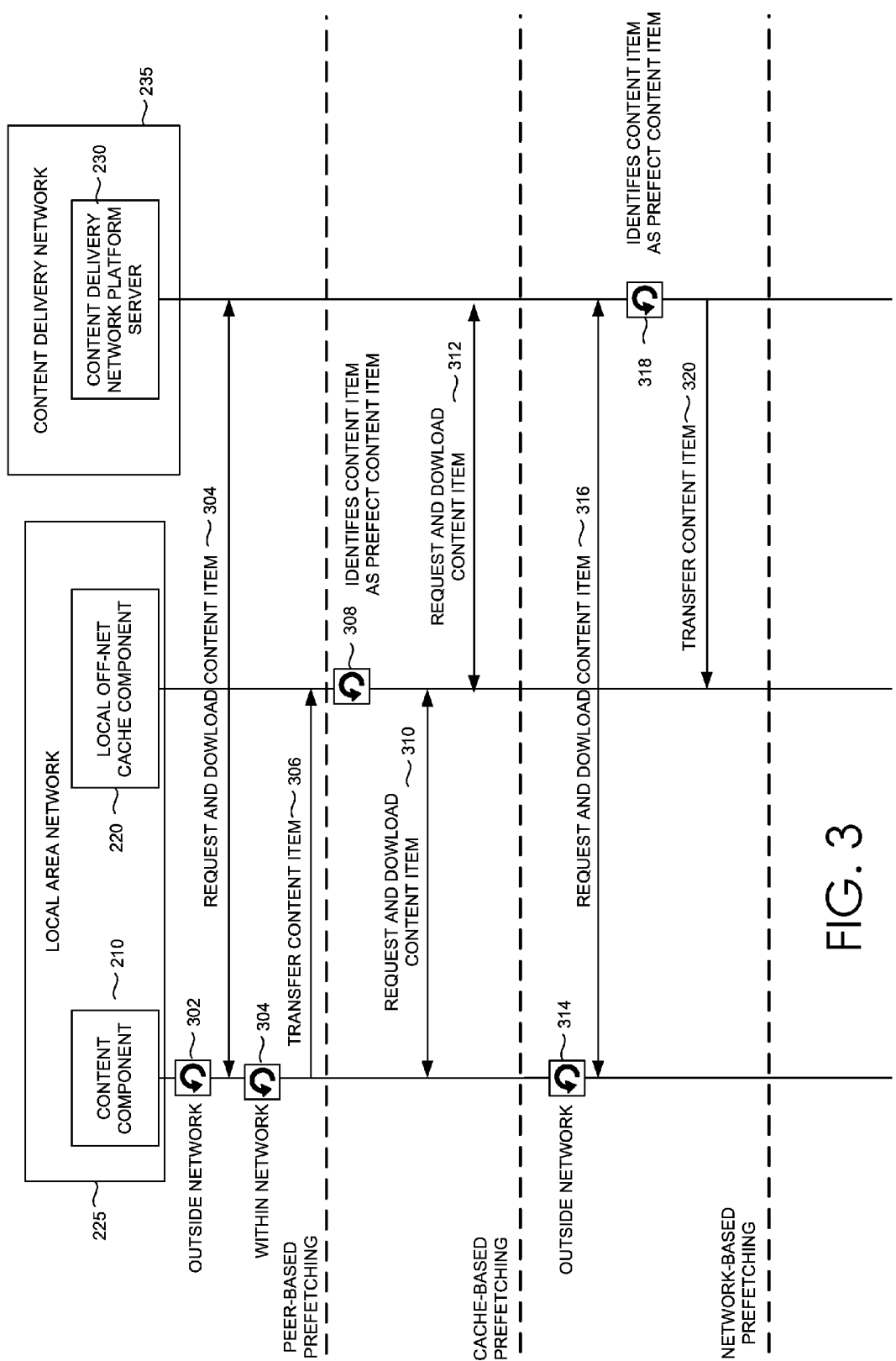
FIG. 3 is a schematic of an exemplary unified content delivery network system, in accordance with embodiments described herein.

With reference to FIG. 3, the content component 210 can further support peer-based prefetching. A peer-based prefetching routine occurs when a prefetch content item is retrieved, from a content device that downloaded the content item independently of the local area network, and communicated as a prefetched content item to the local off-net cache device. The content component 210 is responsible for tracking the content item when the content item is independently retrieved and then designating content item as a prefetch content item. The content item can be designated as a prefetch content item based on profile information. And, upon entering the local area network 225 the content component can support communicating the prefetch content item to the local off-net cache device. In operation, the content component 210 can be outside 302 of the local area network 225. The content component 210 downloads a content item 304 independently of the local area network 225. When the content item is within 306 the local area network 225, the content item is transferred to the local off-net cache component 220. The content item is transferred based on information in the profile.

With continued reference to FIG. 2, the local cache component 220 can be responsible for utilizing the content delivery network platform and protocol for performing operations for retrieving and communicating content items and unified content delivery network profile information in accordance with embodiments described herein. The local cache component 220 can receive a request for a content item using the content delivery network protocol. The content delivery network protocol supports a unified content delivery network profile between content devices, local off-net cache devices, and a content delivery network platform server.

The local cache component 220 performs determination operations to determine whether the content item is cached at the local off-net cache device. The local off-net cache device is identified as corresponding to the content device requesting the content item. When it is determined that the content item is available at the local off-net cache device, the content item is communicated to the content device. When it is determined that the content item is not available at the local off-net cache device, the local cache component 220 is configured to determine retrieval routine for downloading the content item to the content device. The retrieval routine is selected based on the unified delivery network profile and attributes thereof. The local cache component 220 can communicate with the content component 210 to indicate the retrieval routine for retrieving the content item.

The local component 220 can identify a retrieval routine based on accessing the profile information and selecting one of a direct retrieval routine, a simultaneous retrieval routine, and two-phase retrieval routine. In this regard, the retrieval routine can be based on particular attributes in the profile. A direct retrieval routine comprises communicating a notification to the content device indicating that the content item does not exist in the local off-net cache device and the content device can retrieve the content item directly through the internet (e.g., a content item source different from the local off-net cache device). In embodiments, the content item communicates with a content delivery network platform server to retrieve the content item or communicates with a content provider to retrieve the content item.

A simultaneously retrieval routine comprises communicating a notification to the content device indicating that the content item does not exist in the local off-net cache device, but instructing the content device to simultaneously retrieve the content item at the same time the local off-net cache retrieves the content item. In this regard, both the content device and the local off-net cache device can retrieve the same content item at the same time. Selecting the simultaneous retrieval routine can be based on identifying the content item as a prefetch content item for at least one additional device in the profile, such that, the content can be readily available for the additional device. Simultaneous retrieval can also be selected for downloading content items efficiently, such as, each download call retrieving different chunks of the content item. Other variations and combinations of determination factors for selecting a simultaneous retrieval routine are contemplated with embodiments described herein.

A two-phase retrieval routine comprises communicating a notification to the content device indicating that the content item does not exist in the local off-net cache device, but instructing the content device to retrieve the content item from the local off-net cache as the local off-net cache retrieves the content from the content provider. In this regard, both the content device and the local off-net cache device can operate in-tandem to retrieve the content item. Selecting the two-phase retrieval routine can be based on identifying the content item as a prefetch content item for at least on additional device in the profile, such that, the content can be readily available for the additional device. Two-phase retrieval can also be selected for downloading content items efficiently, in that, the local off-net cache device is dedicated to downloading content items which may not be the case for another content device (e.g., video game system) performing additional operations. Other variations and combinations of determination factors for selecting a two-phase retrieval routine are contemplated with embodiments described herein.

The local cache component 220 can further support cache-based prefetching. A cache-based prefetching routine occurs when the local cache component intelligently determines based on the unified content delivery network profile that one or more content items can be retrieved as prefetch content item and then communicates a request to a content device or content delivery network platform server for the content item. In operation, the local cache component 220 identifies 308 a prefetch content item based on profile information. Based on the location of the prefetched content item, the local cache component 220 can request and download 310 the prefetch content item from the content component 210 or request and download 312 the prefetch content item from the content delivery network platform server 230.

The content delivery network platform component 230 is responsible for utilizing integrated components that facilitate the communication of cached content items using the content delivery network platform. The integrated components refer to the hardware architecture and software framework that support content delivery functionality using the content delivery network platform. The hardware architecture refers to generic physical components and interrelationships thereof and the software framework refers to software providing functionality that can be implemented with hardware operated on a device. The software framework can include Application Programming Interfaces (APIs) that include configuration specifications for the unified content delivery network system such that content device, local off-net cache devices, and platform servers can communicate with in the unified content delivery network infrastructure.

The content delivery network platform component 240 is configured for receiving a request for a content item using the content delivery network protocol. The request for the content can be received from a content device or a local off-net cache component. The integrated components support receiving requests and communicating content items based on the content delivery network protocol comprising the unified content delivery network profile. The content delivery network platform server can identify and communicate the content item using the retrieval routine, as discussed herein. The retrieval routine identified using the content delivery network protocol, where the retrieval routine is selected from a group of retrieval routines comprising a direct retrieval routine, a simultaneous retrieval routine, and a two-phase retrieval routine.

With reference to FIG. 3, the content delivery network platform server can further support network-based prefetching. A network-based prefetching routine occurs when content items are retrieved from a content delivery network platform server based on a content device retrieving the content items independently of the local area network and the content delivery network platform server intelligently communicates the prefetch content item to the local off-net cache. In this regard, the user upon returning to a local area network having the local off-net cache device can seamlessly access the prefetch content item from the local off-net cache device, with the content device or another content device. In operation, the content component 210 while outside 314 the local are network, requests and downloads 316 a content item independently of the local area network. The content delivery network platform server determines 318 that the content item is a prefetch content based on profile information. The content delivery network platform server 230 communicates the content item 320 to the local cache component 220.

Figure 4:
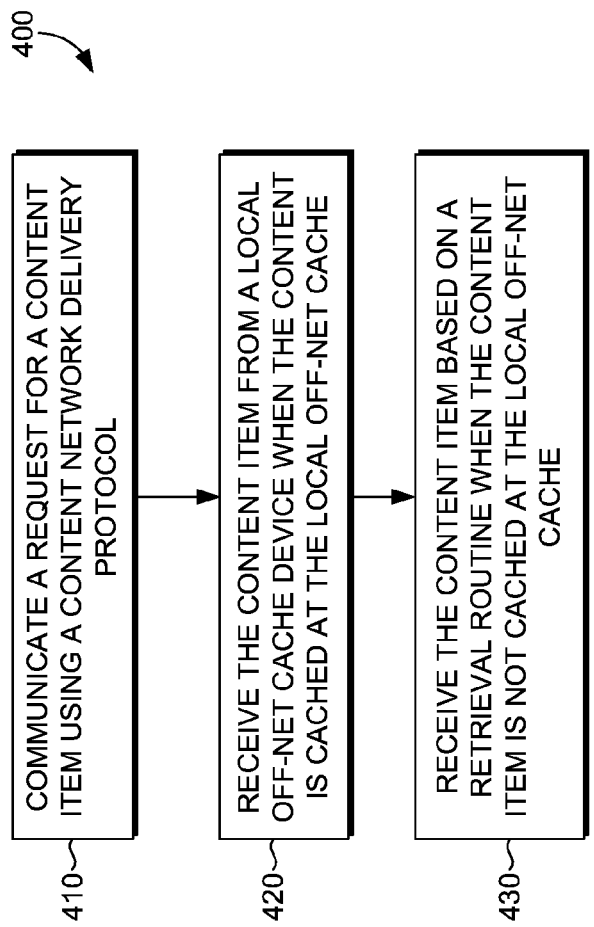
FIG. 4 is a flow diagram showing an exemplary method for accelerating on-premise delivery of content items based on a unified content delivery network system, in accordance with embodiments described herein.

Turning now to FIG. 4, a flow diagram is provided that illustrates a method 400 for accelerating on-premise delivery of content items based on a unified content delivery network system. Initially at block 410, a request for a content item is communicated using a content delivery network protocol. The content delivery network protocol supports a unified content delivery network profile between content devices, local off-net cache devices, and content delivery network platform servers. At block 420, the content item is received from a local off-net cache device when the content item is cached at the local off-net cache. The content item is received using the content network delivery protocol. At block 430, the content item is received based on a retrieval routine when the content item is not cached at the local off-net cache. The retrieval routine is selected based on the unified content delivery network profile.

Figure 5:
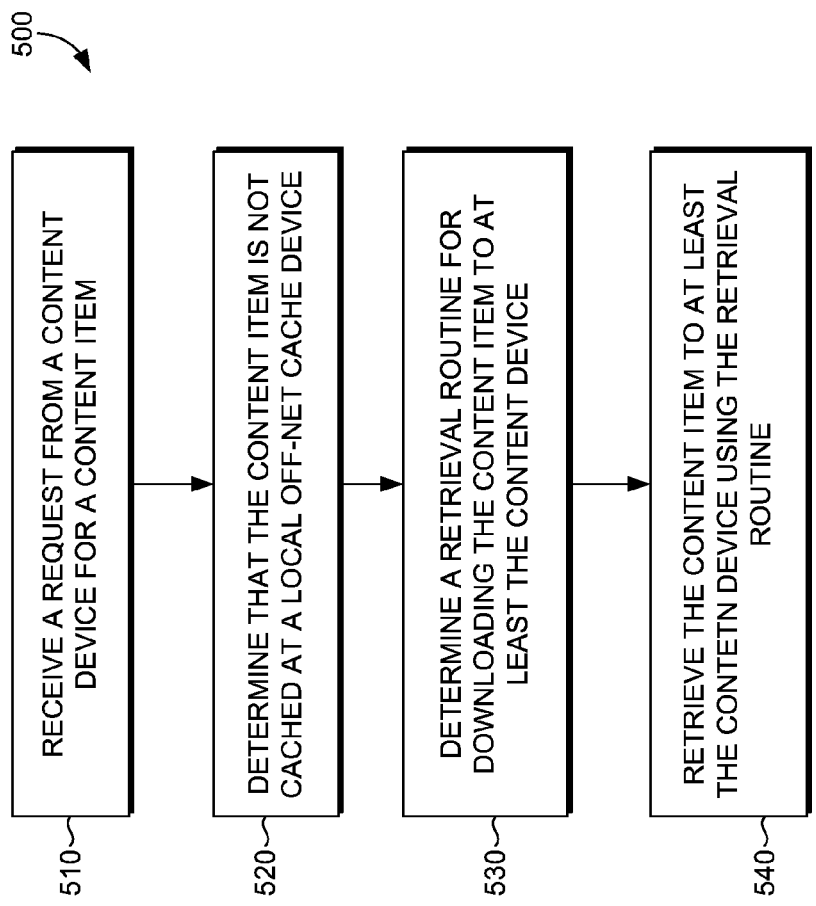
FIG. 5 is a flow diagram showing an exemplary method for accelerating on-premise delivery of content items based on a unified content delivery network system, in accordance with embodiments described herein.

Turning now to FIG. 5, a flow diagram is provided that illustrates a method 500 for accelerating on-premise delivery of content items based on a unified content delivery network system. Initially at block 510, a request is received from a content device for a content item. The request is communicated using a content delivery network protocol; the content delivery network protocol supports a unified content delivery network profile between content delivery network content devices, local off-net cache devices, and content delivery network platform servers. At block 520, a determination that the content item is not cached at a local off-net cache device is made. The local off-net cache device is identified in the unified content delivery network profile as corresponding to one or more content devices. At block 530, a retrieval routine for downloading the content item to at least the content device is determined. The retrieval routine is selected based on the unified content delivery network profile. At block 540, the content item is retrieved to at least the content device, retrieving the content is based on the retrieval routine.

Figure 6:
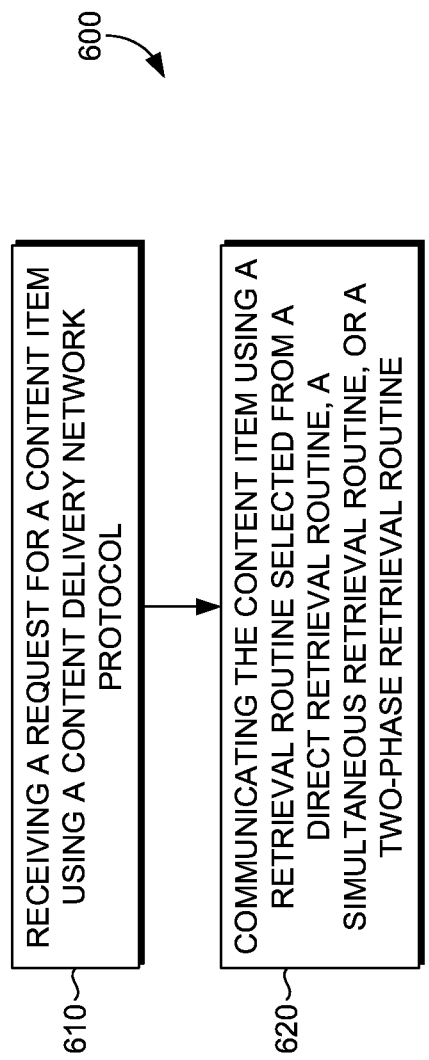
FIG. 6 is a flow diagram showing an exemplary method for accelerating on-premise delivery of content items based on a unified content delivery network system, in accordance with embodiments described herein.

Turning now to FIG. 6, a flow diagram is provided that illustrates a method 600 for accelerating on-premise delivery of content items based on a unified content delivery network system. Initially at block 610, a request for a content item is received using the content delivery network protocol. The request is received at a content delivery network platform having integrated components that support communicating content items based on the content delivery network protocol comprising the unified content delivery network profile. At block 620, the content item is communicated using the retrieval routine. The retrieval routine is identified using the content delivery network protocol. The retrieval routine is selected from a group of retrieval routines comprising a direct retrieval routine, a simultaneous retrieval routine, and a two-phase retrieval routine.

Having briefly described an overview of embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
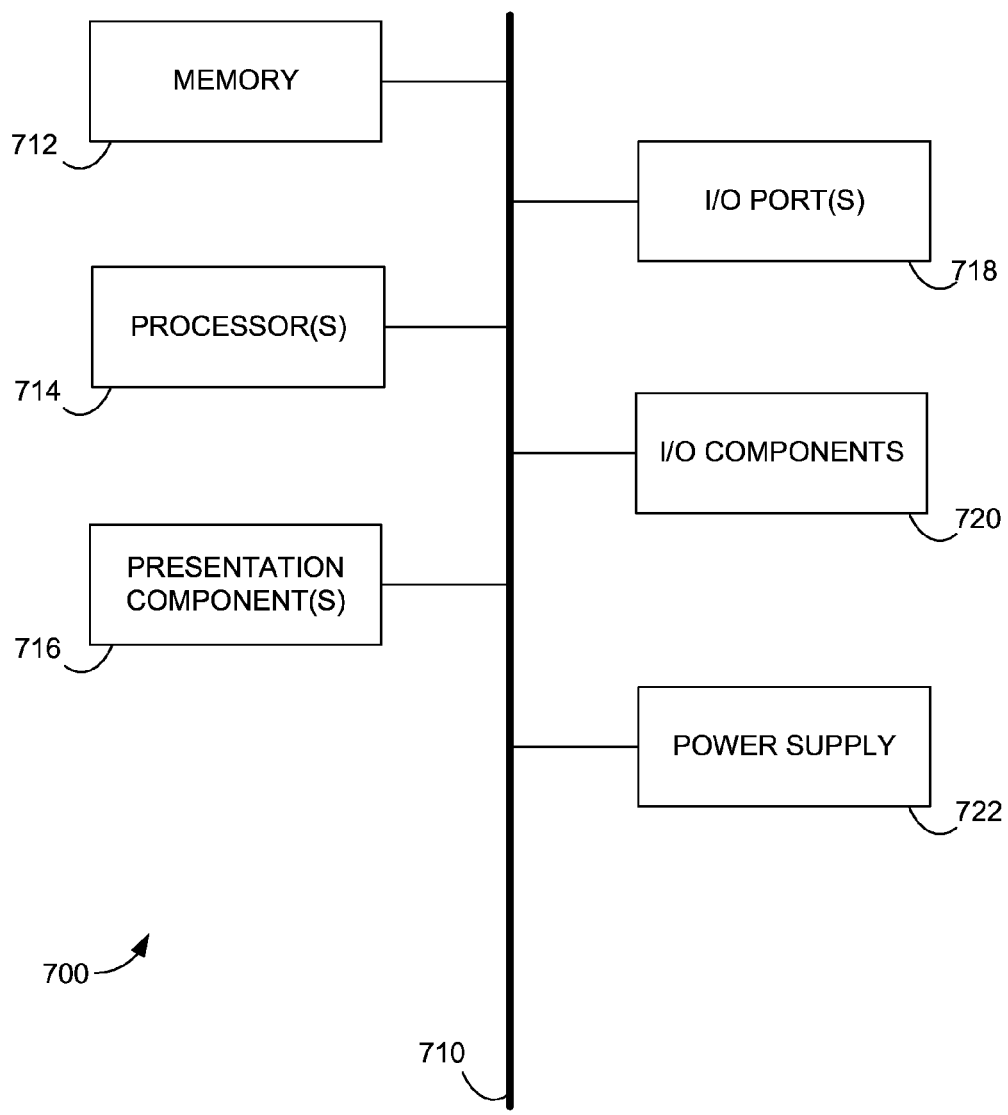
FIG. 7 is a block diagram of an exemplary computing environment suitable for use in implementing embodiments described herein.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for accelerating on-premise delivery of content items based on a unified content delivery network system, the system comprising:
   a content component configured for:
      communicating a request for a content item using a content delivery network protocol, wherein the content delivery network protocol supports a unified content delivery network profile between content devices, local off-net cache devices, and content delivery network platform servers;
      receiving the content item from a local off-net cache device when the content item is cached at the local off-net cache device, wherein the content item is received using the content network delivery protocol; and
      receiving the content item based on a retrieval routine when the content item is not cached at the local off-net cache, wherein the retrieval routine is selected based on the unified content delivery network profile;
   a local off-net cache component configured for:
      receiving the request from the content device for the content item, wherein the request is communicated using the content delivery network protocol;
      determining that the content item is not cached at the local off-net cache device, wherein the local off-net cache device is identified in the unified content delivery network profile as corresponding to one or more content devices;
      determining a retrieval routine for downloading the content item to the content delivery network content device, wherein the retrieval routine is selected based on the unified content delivery network profile; and
      retrieving the content item to the local off-net cache device, wherein retrieving the content is based on the retrieval routine; and
   a content delivery network platform component configured for:
      receiving the request for the content item using the content delivery network protocol, wherein the request is received at a content delivery network platform having integrated components that support communicating content items based on the content delivery network protocol comprising the unified content delivery network profile; and
      communicating the content item using the retrieval routine, wherein the retrieval routine identified using the unified content delivery network profile.

2. The system of claim 1, wherein the content component is further configured for:
   generating data for the unified content delivery network profile based on automatically discovering one or more content devices and a local off-net cache device that corresponds to the one or more content devices, wherein automatically discovering the one or more content devices and the local off-net cache device is based on a dynamic connectivity mechanism that supports zero-configuration.

3. The system of claim 2, wherein the unified content delivery network profile comprises an indication of content items, content providers and corresponding to the discovered content devices that share a local area network having the local off-net cache device, wherein the content items, content providers, and corresponding content devices are tracked for logically retrieving requested content items and prefetching anticipated content items using the local off-net cache.

4. The system of claim 1, wherein the unified content delivery network profile is configurable with configuration settings for managing attributes of the unified content delivery profile.

5. The system of claim 4, wherein attributes of the unified content delivery network profile are updated to reflect changes in the content devices and local off-net cache devices, and an updated content delivery network profile is communicated using the content delivery network protocol to the content devices, the local off-net cache devices, and the content delivery network platform servers.

6. The system of claim 1, wherein the retrieval routine is selected from a group of retrieval routines comprising a direct retrieval routine, a simultaneous retrieval routine, and a two-phase retrieval routine.

7. The system of claim 6, wherein each of the direct retrieval routine, the simultaneous retrieval routine, and the two-phase retrieval routine corresponds to attributes in unified content delivery network profile that determine selection of the retrieval routine for downloading the content item using the content network delivery protocol.

8. The system of claim 1, wherein content component is further configured for peer-based prefetching, wherein peer-based prefetching comprises:
receiving a second content item independently of the local off-net cache device;
identifying the second content item as a prefetch content item, wherein the second content item is identified as a prefetch content item based on the unified content delivery network profile; and
communicating the second content item to the local off-net cache device based on the content network delivery protocol via a local area network.

9. The system of claim 1, wherein receiving the second content item independently comprises retrieving the second content item outside of the local area network of the content device and the local off-net cache device.

10. The system of claim 1, wherein the content delivery network platform component is further configured for network-based prefetching, wherein network-based prefetching comprises:
communicating a third content item to a content device independently of the local off-net cache device;
identifying the third content item as a prefetch content item, wherein the third content item is identified as a prefetch content item based on the unified content delivery profile; and
communicating the third content item to the local off-net cache device based on the content network delivery protocol via the content delivery network platform server.

11. The system of claim 1, wherein the local off-net cache component is further configured for cache-based prefetching comprising:

receiving a second content item, as a prefetch content item, from the content device, the second content item identified as a prefetch content item using the unified content delivery network profile; and
receiving a third content item, as a prefetch content item, from the content delivery network platform server, the third content item identified as a prefetch content item using the unified content delivery network profile.

12. One or more computer storage media having computer-executable instructions embodied thereon that, when executed, by one or more processors, causes the one or more processors to perform a method for communicating content delivery network content items based on a unified content delivery network system, the method comprising:
receiving a request from a content device for a content item, wherein the request is communicated using a content delivery network protocol, wherein the content delivery network protocol supports a unified content delivery network profile between content devices, local off-net cache devices, and content delivery network platform servers;
determining that the content item is not cached at a local off-net cache device, wherein the local off-net cache device is identified in the unified content delivery network profile as corresponding to one or more content devices;
determining a retrieval routine for downloading the content item to the content device, wherein the retrieval routine is selected based on the unified content delivery network profile; and
retrieving the content item to the content device, wherein retrieving the content is based on the retrieval routine.

13. The media of claim 12, wherein the direct retrieval routine comprises:
instructing the content device to retrieve the content item directly from a content item source different from the local off-net cache device.

14. The media of claim 12, wherein the simultaneous retrieval routine comprises:
instructing the content device to retrieve the content item directly from a content item source different from the local off-net cache device while the local off-net cache device simultaneously retrieves at least portions of the same content.

15. The media of claim 12, wherein the two-phase routine comprises:
instructing the content device to retrieve the content item from the local off-net cache device while the local off-net cache device retrieves the content item from another content item source.

16. The media of claim 12, further comprising:
receiving a prefetch content item, from the content device or the content delivery network platform server, wherein the prefetch content item is identified as a prefetch content item using the unified content delivery network profile.

17. A computer-implemented method for communicating content delivery network content items based on a unified content delivery network system, the method comprising:
receiving a request for a content item using the content delivery network protocol, wherein the request is received at a content delivery network platform having integrated components that support communicating content items based on the content delivery network protocol supports a unified content delivery network profile between content devices, local off-net cache devices, and content delivery network platform servers; and communicating the content item using a retrieval routine if the content item is not cached at a local off-net cache device identified in the unified content delivery network profile as corresponding to one or more content devices, wherein the retrieval routine is selected based on the unified content delivery network profile, wherein the retrieval routine is selected from a group of retrieval routines comprising a direct retrieval routine, a simultaneous retrieval routine, and a two-phase retrieval routine.

18. The method of claim 17, wherein integrated components refer to the hardware architecture and software framework that support content delivery functionality using the content delivery network platform.

19. The method of claim 17, wherein the content delivery network platform further comprises application programming interfaces for end-to-end software-based operations on content delivery network platform servers, local off-net cache devices, and content devices.

20. The method of claim 17, further comprising:
communicating a second content item to a content device independently of the local off-net cache device;
identifying the second content item as a prefetch content item, wherein the second content item is identified as a prefetch content item based on the unified content delivery profile; and
communicating the second content item to the local off-net cache device based on the content network delivery protocol via the content delivery network platform server.

* * * * *